United States Patent
Arhab et al.

(10) Patent No.: US 7,543,694 B2
(45) Date of Patent: Jun. 9, 2009

(54) HYDROKINETIC COUPLING DEVICE, PARTICULARLY FOR A MOTOR VEHICLE

(75) Inventors: Rabah Arhab, St Brice S/Foret (FR); Norberto Termenon, Amiens (FR)

(73) Assignee: Valeo Embrayages, Amiens Cedex (FR)

( * ) Notice: Subject to any disclaimer, the term of this patent is extended or adjusted under 35 U.S.C. 154(b) by 179 days.

(21) Appl. No.: 10/590,440

(22) PCT Filed: Feb. 28, 2005

(86) PCT No.: PCT/FR2005/050130

§ 371 (c)(1),
(2), (4) Date: Aug. 23, 2006

(87) PCT Pub. No.: WO2005/085678

PCT Pub. Date: Sep. 15, 2005

(65) Prior Publication Data

US 2007/0163852 A1    Jul. 19, 2007

(30) Foreign Application Priority Data

Mar. 2, 2004   (FR)   .................................. 04 50422

(51) Int. Cl.
*F16H 45/02*   (2006.01)
*B23K 20/12*   (2006.01)
(52) U.S. Cl. ..................... 192/3.29; 192/70.17; 192/212
(58) Field of Classification Search ................ 192/3.29, 192/3.3
See application file for complete search history.

(56) References Cited

U.S. PATENT DOCUMENTS

| | | | | |
|---|---|---|---|---|
| 5,533,602 A * | 7/1996 | Worner et al. | ............... | 192/3.29 |
| 6,193,037 B1 * | 2/2001 | Middelmann et al. | ...... | 192/3.29 |
| 6,223,872 B1 * | 5/2001 | Heller et al. | ................ | 192/3.29 |
| 6,286,648 B1 * | 9/2001 | Matsuoka | ................... | 192/3.29 |
| 6,439,361 B2 * | 8/2002 | Maienschein et al. | ........ | 192/3.3 |
| 6,464,054 B2 * | 10/2002 | Fukunaga et al. | .......... | 192/3.29 |
| 6,695,109 B2 | 2/2004 | Wack et al. | | |
| 2002/0125093 A1 * | 9/2002 | Maienschein et al. | ........ | 192/3.3 |
| 2002/0175037 A1 * | 11/2002 | Wack et al. | ................ | 192/3.29 |
| 2003/0042098 A1 * | 3/2003 | Takeuchi et al. | ........... | 192/3.29 |
| 2007/0256905 A1 * | 11/2007 | Brees et al. | ................ | 192/3.29 |

FOREIGN PATENT DOCUMENTS

DE   43 45 399 C2   2/1999
FR   2 732 427      10/1996

* cited by examiner

*Primary Examiner*—Rodney H Bonck
*Assistant Examiner*—John V Ligerakis
(74) *Attorney, Agent, or Firm*—Berenato, White & Stavish, LLC.

(57) ABSTRACT

The invention relates to a hydrokinetic coupling device (10) characterized by the fact that the web (74) comprises, at the inner radial end thereof, a collar (86), which axially extends toward the front between the turbine wheel (32) and the turbine hub (40) and which is rotationally joined by friction welding respectively: at the front, to the turbine wheel (32) by a first weld joint (88) provided between a front annular contact face (90) of the collar (86) and a rear welding face (92) opposite the inner radial periphery of the turbine wheel (32) and; at the rear, to the turbine hub (40) by a second rear weld joint (96) provided between a rear annular contact face (98) of the collar (86) and a front welding face (100) opposite the outer radial periphery of the turbine hub (40).

12 Claims, 1 Drawing Sheet

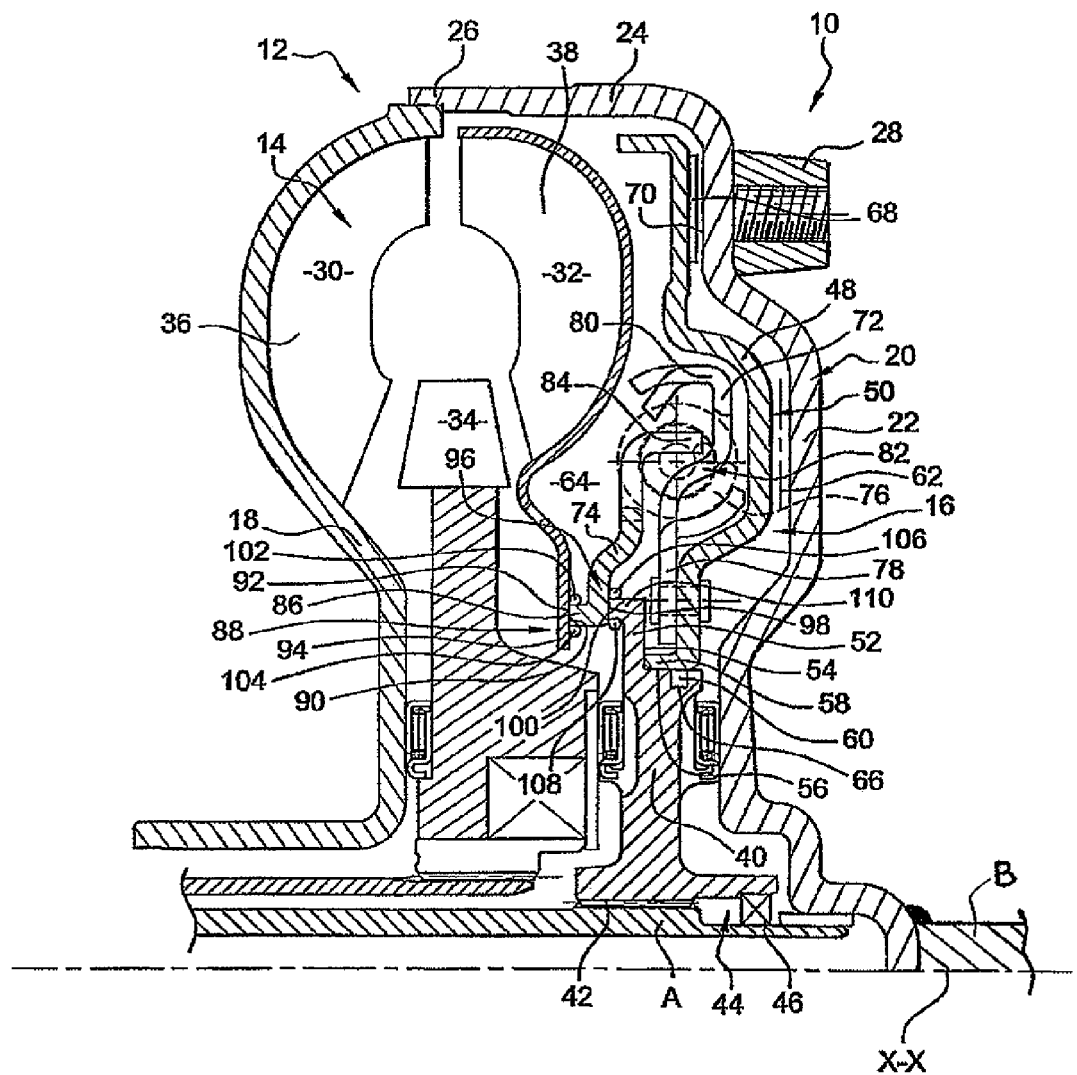

US 7,543,694 B2

HYDROKINETIC COUPLING DEVICE, PARTICULARLY FOR A MOTOR VEHICLE

INTERNATIONAL PATENT APPLICATION NO. PCT/FR2005/050130, PUBLICATION NO. WO2005/085678

BACKGROUND OF THE INVENTION

1. Field of the Invention

The present invention relates to hydrokinetic coupling apparatus, especially for a motor vehicle.

2. Description of the Related Art

Numerous hydrokinetic coupling apparatuses are known in the current state of the art, among which are various designs of apparatus according to their applications, and in particular apparatus of the "monoface", "biface" or again "multi-disc" types.

It is for example known, from the documents FR-A-2 825 770 or FR-A-2 765 938, to provide a hydrokinetic coupling apparatus of the "monoface" type, which comprises, considered axially from front to rear:

- a casing consisting of a rear shell which is adapted to be coupled in rotation to a driving shaft, an impulse wheel, and a front shell;
- a turbine wheel, which is arranged for rotation with a turbine hub, which is adapted to be coupled in rotation to a driven shaft;
- a lock-up clutch for coupling the driving shaft and the driven shaft together, which is operatively interposed between the turbine wheel and the rear shell and comprises a piston, which is movable axially for releasably coupling together the rear shell and the driven shaft), and which includes a damping device, the damping device comprising at least one guide ring which constitutes the input element, a damper plate constituting the output element, and circumferentially acting elastic members interposed between the input element and output element, which are coupled together in rotation but with the ability to perform predetermined circumferential displacement, and of the type in which the turbine wheel, the turbine hub and the damper plate of the damping device are coupled in rotation by means of joints that are rigid, i.e. they have no play.

In general terms, the rigid rotational couplings between the turbine wheel and turbine hub or an input or output element of the damping device, which is also called the damper, can be achieved with any appropriate kind of joint, and especially by riveting, welding or meshing engagement.

Thus, there are generally, in particular, a first rigid joint by means of which the turbine wheel is coupled in rotation to the turbine hub, and a second rigid joint by means of which the turbine wheel is coupled in rotation to an element of the damper.

In the document FR-A-2 825 770, the hydrokinetic coupling apparatus of the "monoface" type includes a first coupling between the turbine wheel and the turbine hub, which is formed by riveting, and a second coupling between the turbine wheel and the damper plate which is formed by welding.

In a modified version in the document FR-A-2 765 938, the second coupling between the turbine hub and the damper plate of the damper is also made by riveting.

Hydrokinetic coupling apparatuses of the "multi-disc" type are also known, in which the coupling means between the turbine wheel, turbine hub and input element of the damping device are axial rivets, and such an arrangement is for example described in the document FR-A-2 839 128.

However, riveting is a method of making a joint which does not always give full satisfaction. Riveting has various disadvantages, and in particular it requires costly machining operations by way of precision drilling in each of the components to be coupled together in rotation, to form the holes for the passage of the bodies of the rivets.

In addition, the heads of the rivets increase the general axial size of the apparatus, and although riveting is simple to apply, it is an expensive way of fastening because of the overall time needed to carry out all the various operations.

The document U.S. Pat. No. 5,975,261 describes a further hydrokinetic coupling apparatus of the "multi-disc" type, in which a first rigid coupling is made by friction welding, and the second coupling is made by mating cooperation between, on the one hand, lugs which are formed in the guide ring, and secondly apertures provided in the turbine hub.

Rigid couplings of the meshed type also have disadvantages, in particular as regards treatments and precision machining operations in order to make the complementary male and female parts, and they are therefore expensive. In addition, a coupling of this kind is not reliable enough in respect of its liability to wear, so that undesirable noise will tend to occur.

That is why welding, and more particularly friction welding, is often the preferred fastening method for coupling the turbine wheel, turbine hub and damper plate, or one of the guide rings of the damper, rigidly together.

However, with welding it is also necessary that the weld bands be accessible, in particular in order to enable operations of control and cleaning of the weld bands to be carried out.

Nevertheless, in currently known apparatus designs, the turbine wheel, turbine hub and damper plate do not enable operations of these kinds to be easily performed, and therefore do not give any guarantee as to the quality and reliability of the welded joints.

In addition, in current motor vehicles, the space available for fitting the engine is becoming smaller and smaller, especially because of the addition of further components, so that smaller size, and consequently a high degree of axial compactness, of the apparatuses, is constantly being sought.

More precisely, in the case where the turbine hub is interposed axially between the turbine wheel and the damper plate of the damper, it is necessary to control the first welded joint, at the front, which couples the turbine wheel with the turbine hub in rotation, and also the second joint at the rear which couples the hub rigidly to the damper plate of the damper.

Now, those designs which are currently known do not enable access to be gained satisfactorily to the weld bands of the first and second joints, and particularly to the inner rear weld band of the second joint.

SUMMARY OF THE INVENTION

A main object of the invention is to provide a remedy for the disadvantages discussed above, and to provide a hydrokinetic coupling apparatus of the type defined earlier herein which will be reliable, simple and inexpensive, both in manufacture and in assembly.

With this is in view, the invention proposes a hydrokinetic coupling apparatus of the type defined above, characterised in that the damper plate comprises at its inner radial end a flange portion which extends axially forward between the turbine wheel and the turbine hub, and which is coupled in rotation, by friction welding, respectively:

at the front, to the turbine wheel by means of a first welded joint formed between an annular front contact face of the flange portion and a rear weld face in facing relationship with the inner radial periphery of the turbine wheel, and at the rear, to the turbine hub through a rear second welded joint formed between an annular rear contact face of the flange portion and a front weld face in facing relationship with the outer radial periphery of the turbine hub.

Thanks to the invention, reliable joints are achieved, and the controlled performance of the friction welding operations enables high precision to be obtained during assembly of the turbine wheel, damper plate and turbine hub in a unitary sub-assembly.

In addition, friction welding is an advantageous manufacturing method which enables high precision, with high repeatability, to be obtained in mass production.

Preferably, this unitary sub-assembly includes a front space which is delimited, firstly, axially at the front by the rear face of the turbine wheel and at the rear by the front face of the radial plate portion of the turbine hub, and secondly, delimited radially on the outside by inner axial face of the flange portion, in such a way as to permit access to the inner weld bands of the first welded joint and the second welded joint respectively, in particular with a view to effecting visual control and/or cleaning of the said weld bands.

The weld bands of the welded joints have the advantage of being easily accessible, which facilitates the operations of control and/or cleaning, and it reduces the time which has hitherto been needed to carry out these operations.

According to further features of the invention:

the mean diameters of the annular contact faces, namely the front contact face and rear contact face, of the flange portion are substantially equal to each other;

the first welded joint, between the annular front transverse contact face of the flange portion and the transverse rear weld face of the turbine wheel, comprises an outer front weld band and an inner front weld band, the flange portion of the damper plate extending axially over a predetermined length such as to permit access to the outer weld band and inner weld band, respectively, of the first welded joint, in particular with a view to performing visual control and/or cleaning of the said bands;

the second welded joint, between the annular rear transverse contact face of the flange portion and the front transverse weld face of the turbine hub, comprises a rear outer weld band and a rear inner weld band;

the mean diameters of the front inner weld band and rear inner weld band of the first and second welded joints are substantially equal to each other;

the mean diameters of the front inner weld band and the rear inner weld band of the first and second welded joints are substantially equal to the internal diameter of the flange portion;

the turbine hub includes a radial plate portion, the outer radial periphery of which includes an annular boss which extends axially forwards and is substantially equal to the greatest external diameter of the radial plate portion of the turbine hub;

the mean diameter of the rear outer weld band is substantially equal to the greatest external diameter of the radial plate portion of the turbine hub;

the flange portion of the damper plate is press-formed.

Further features and advantages of the invention will appear on a reading of the following description, for an understanding of which reference will be made to the single drawing, which shows diagrammatically a half view in axial cross section of a hydrokinetic coupling apparatus according to the invention.

BRIEF DESCRIPTION OF THE DRAWING

FIG. 1 is a cross sectional view of a hydrokinetic coupling apparatus according to the instant invention.

DETAILED DESCRIPTION OF THE PREFERRED EMBODIMENTS

In the following description, those components which are identical, similar or analogous to each other will be designated by the same reference signs.

In order to facilitate understanding of the description and claims, we will use, though without limitation, "front" and "rear" orientations which correspond to the left and right hand sides respectively in the drawing; and "axial—radial" and "external/outer/outside—internal/inner/inside" orientations with respect to the general axis of rotation X-X of the hydrokinetic coupling apparatus.

The drawing shows a hydrokinetic coupling apparatus 10 which in this case is of the "monoface" type and which comprises a torque converter 14 and a lock-up clutch 16, which are arranged within a sealed casing 12 filled with oil.

The function of a hydrokinetic coupling apparatus 10 of this kind is to couple together two shafts, namely a driving shaft B and a driven shaft A respectively in the case of an application to an automatic transmission for a motor vehicle. In that case, the driving shaft B is the output shaft of the engine of the vehicle, while the driven shaft A is coupled to means for changing speed ratios.

The casing 12 comprises a front shell 18 and a rear shell 20, which are preferably assembled together sealingly by welding.

The rear shell 20 has a transverse wall 22 which extends radially, and the outer end of which is extended in length, after a portion welded at 90☐, by an axially oriented skirt portion 24 which extends forward. The free terminal edge 26 of the skirt portion is preferably so designed that it enables it to be joined by laser type welding with the free end of the rear shell 20.

The transverse wall 22 of the rear shell 20 of the casing 12 includes on its rear face coupling means 28 which, in the present example, are attached by welding on the radial periphery of the wall 22, and which comprise means defining a nut which is arranged to receive screws (not shown) for fastening the apparatus 0.10 to a connecting face plate member of the engine (not shown).

The torque converter 14 comprises an impulse wheel 30 at the front, a turbine wheel 32 at the rear, and a central reaction wheel 34.

The impulse wheel 30 includes vanes 36 which are carried by the front shell 18 of the casing 12, which is adapted to be coupled in rotation (i.e. drivingly or non-rotatably coupled) to the driving shaft B.

The turbine wheel 32 similarly includes vanes 38 which lie facing towards the vanes 36 of the impulse wheel 30.

The turbine wheel 30 is coupled in rotation to a turbine hub 40, which is adapted to be coupled, through driving means 42, to the driven shaft A coaxial with the axis X-X of the apparatus 10.

The rotational drive means 42 operatively interposed between the hub 40 and the driven shaft A are, in the present example, defined by mating cooperation between complementary axial grooves and splines which are formed respectively on those two components.

The hub 40 and shaft A each have a groove which, in the hub 40, is towards the rear and, more precisely, in line with the drive means 42 and towards the inside, while in the shaft A it is towards the outside, and once the hub 40 and shaft A are coupled together, the respective grooves define a housing 44 in which a sealing ring 46 is mounted.

The driven shaft A preferably includes at its rear end a chamfer for facilitating fitting of the seal 46.

The lock-up clutch 16 comprises a piston 48 which is axially movable, so as to couple the turbine wheel 32 releasably to the driven shaft A, together with a damping device, or damper, 50.

The radially outer part of the turbine hub 40 includes, axially at the front, a radial plate portion 52 which extends radially outwards and which delimits, by its transverse rear abutment face 54, an annular sliding surface 56 on which the piston 48 is mounted.

The piston 48, which extends generally transversely, includes at its inner radial periphery an L-shaped portion that includes a sleeve portion 58 which extends axially forward and which cooperates sealingly with the surface 56 of the hub 40 which it surrounds.

More precisely, a sealing means 60, such as a segment or sealing ring, is interposed between the inner surface of the sleeve portion 58 of the piston 48 and the surface 56, in such a way as to provide sealing between a rear first chamber 62, referred to as the control chamber, and a front second chamber 64 which is referred to as the turbine chamber.

The sealing means 60 in this example is carried by the hub 40, though in a modified version it can be carried by the piston 48, and it is mounted in an annular groove 66 formed in the surface 56.

Preferably, the surface 56 is formed with a terminal chamfer at its rear axial end, so as to facilitate the fitting of the said sealing means 60 by insertion.

Because the apparatus 10 is of the "monoface" type, the lock-up clutch 16 includes an annular friction liner 68 which in this example is carried by the rear face of the outer radial periphery of the piston 48 on which the said liner 68 is, for example, attached by adhesive bonding, the liner being adapted to come into contact with a friction surface 70 which is situated in axial facing relationship with it on the front face of the transverse wall 22 of the rear shell 20 of the casing 12.

Preferably, the friction liner 68 has grooves (not shown), the profile of which is variable according to the application, and which, in particular, enables cooling to be improved in the vicinity of the friction surface 70, which works in controlled sliding movement.

The lock-up clutch 16 for coupling the driving shaft with the driven shaft A, which is operatively interposed between the turbine wheel 32 and the rear shell 20, is brought into operation after the vehicle has been started and the driving shaft B and driven shaft A have been coupled together hydraulically, so as to avoid the loss of output which is in particular caused by sliding effects between the turbine wheel 32 and the impulse wheel 30.

Thus, in the course of a first operating phase which is called the conversion phase, the torque from the driving shaft is transmitted to the impulse wheel 30, which drives the turbine wheel 32 by virtue of the flow of oil between the vanes 36 and 38.

During this conversion phase, the damper 50 does not play a part in the damping out of torsional vibrations or oscillations which are caused, in particular, by acyclic effects in the engine, and which are not transmitted at all, or hardly transmitted, because the transmission of the engine torque from the driving shaft to the driven shaft A is achieved solely through the kinetic energy of the oil in the torque converter 14.

In the course of a second operating phase, by causing the pressure to vary on either side of the piston 48, that is to say between the control chamber 62 and turbine chamber 64, the piston 48 is displaced axially towards the rear in order to proceed to lock-up, also referred to as bridging, and it is reversed so as to be displaced forward subsequently so as to effect unlocking, or de-bridging.

Thus, when the piston 48, moved by pressure, is displaced axially towards the rear in order to grip the friction liner 68 against the friction surface 70 of the transverse wall 22 of the casing 12, the torque is transmitted from the wall 22 of the casing 12 to the turbine wheel 32, across the damping device 50, and no longer through the turbine wheel 32 and impulse wheel 30 of the torque converter 14 as it was during the conversion phase.

The torsion device 50 of the lock-up clutch 16 comprises, in this example, an input element which comprises a guide ring 72, an output element which comprises a damper plate 74, and circumferentially acting elastic members 76 which are interposed between the input element 72 and output element 74, and which are thus coupled in rotation with each other, but with the ability to perform a predetermined angular displacement.

In the known way, the guide ring 72 includes, firstly, a radially inner portion 78 which extends generally transversely and which is riveted on the piston 48 so as to couple the input side of the damper 50 in rotation with the piston 48, and secondly, a generally C-shaped radially outer portion or half-torus, with windows 82 in which the circumferentially acting elastic members 76 are received.

The elastic members 76 are thus in engagement, firstly on the lateral edges of the windows 82, and secondly on a portion of the damper plate 74.

For this purpose the damper plate 74 has at its outer radial periphery lugs 84 which extend axially towards the rear and against the lateral faces on which the elastic members 76 bear.

The turbine wheel 32, the turbine hub 40 and, in the present case, the damper plate 74 of the damper 50 are coupled in rotation with each other by rigid joints, i.e. joints not having any play, which are made by welding, and in particular by friction welding.

In accordance with the invention, the damper plate 74 includes at its inner radial end a flange portion 86 which extends axially forward between the turbine wheel 32 and the turbine hub 40, and which is coupled in rotation to each of those components respectively by friction welding.

More precisely, the flange portion 86 of the damper plate 74 is coupled in rotation by friction welding, respectively:

at the front, to the turbine wheel 32 through a welded joint 88 which is made between an annular front contact face 90 of the flange portion 86 and a rear weld face 92 in facing relationship with the radial inner periphery 94 of the turbine wheel 32, and at the rear, to the turbine hub 40 through a second welded joint 96 which is made between an annular rear contact face 98 of the flange portion 86 and a front weld face 100, which is in facing relationship with the outer radial periphery of the radial plate portion 52 of the turbine hub 40.

The invention enables a unitary sub-assembly to be constructed, which consists of the turbine wheel 32, the turbine hub 40, and, in the present case, the damper plate 74 of the damper 50, and in which the inner and outer bands, respectively, of the first welded joint and the second welded joint are easily accessible so that, in particular, it is possible to control them and/or clean them visually.

Preferably, the first welded joint is made in the course of a first step, and the second welded joint in the course of a second step.

In addition, the mean diameters of the annular contact faces of the flange portion 86, namely the front contact face 90 and rear contact face 98, are substantially equal to each other.

More precisely, the first welded joint 88 between the annular front transverse contact face 90 of the flange portion 86 and the transverse rear weld face 92 of the turbine wheel 32, comprises a front outer weld band 102 and a front inner weld band 104, the flange portion 86 of the damper plate 74 extending axially over a predetermined length such as to permit access to be obtained to the outer weld band 102 and inner weld band 104 respectively of the first welded joint 88, in particular with a view to effecting visual control and/or cleaning of the said weld bands.

Similarly, the second welded joint 96, between the annular rear transverse contact face 98 of the flange portion 86 and the transverse front weld face 100 of the turbine hub 40, comprises a rear outer weld band 104 and a rear inner weld band 106.

Preferably, the mean diameters of the front inner weld band 104 and rear inner weld band 108 of the first and second welded joints 88 and 96 are substantially equal to each other, so as, more particularly, to facilitate access from the rear to the outer weld band of the second joint.

The mean diameters of the front inner weld band 104 and rear inner weld band 108 of the first and second welded joints 88 and 96 are preferably substantially equal to the inside diameter of the flange portion 86, so that the inner weld bands of the first and second joints are disposed substantially in the same plane as the internal face of the flange portion, and can therefore be easily controlled and/or cleaned.

The radial plate portion 52 of the turbine hub 40 includes at its radially outer periphery an annular boss 110 which extends axially forward and which carries the said front weld face 100 of the turbine wheel 40.

The mean diameter of the rear outer weld band 106 is substantially equal to the greatest external diameter of the radial plate portion 52 of the turbine hub 40, that is to say the outer diameter of the radial end of the radial plate portion 52 or of the boss 100.

The damper plate 74 is in one piece made from metal plate or similar material, in such a way that the flange portion 86 is preferably made by press-forming.

The application of the present invention is of course not limited to a hydrokinetic coupling apparatus in which the lock-up clutch is of the "monoface" type.

Accordingly, the arrangements could be used in hydrokinetic coupling apparatuses in which the lock-up clutch is of the "bi-face" type, that is to say those in which the lock-up clutch includes, in particular, a friction disc which is arranged to be gripped axially by the piston against the transverse wall of the rear shell of the casing, to which the said piston is coupled in rotation with axial mobility, or in which the lock-up clutch is of the "multi-disc" type, also called "three-way" by comparison with the "monoface" and "bi-face" types which only have two discs.

For more details about the operation of these apparatuses, reference should be made for example to the following documents: FR-A-2 748 539, FR-A-2 814 790 or FR-A-2 816 019 for apparatus of the "bi-face" type, and, for apparatus of the "multi-disc" type, to the documents FR-A-2 839 128 or FR-A-2 843 433.

The invention claimed is:

1. A Hydrokinetic coupling apparatus (10), especially for a motor vehicle, comprising:
  a casing (12) including a rear shell (20) adapted to be coupled in rotation to a driving shaft (B), an impulse wheel (30), and a front shell (18);
  a turbine wheel (32) arranged for rotation with a turbine hub (40) adapted to be coupled in rotation to a driven shaft (A);
  a lock-up clutch (16) for coupling the driving shaft and the driven shaft together, the lock-up clutch (16) being operatively interposed between the turbine wheel (32) and the rear shell (20) and comprising a piston (48) movable axially for releasably coupling together the rear shell (20) and the driven shaft (A), and which includes a damping device (50),
  the damping device (50) comprising at least one guide ring (72) constituting the input element, a damper plate (74) constituting the output element, and circumferentially acting elastic members (76) interposed between the input element (72) and the output element (74) coupled together in rotation but with the ability to perform predetermined circumferential displacement,
  the turbine wheel (32), the turbine hub (40) and the damper plate (74) of the damping device (50) being non-rotatably coupled by means of rigid joints,
  the damper plate (74) comprising at its inner radial end a flange portion (86) axially extending toward the turbine wheel (32) and non-rotatably coupled, by friction welding, respectively:
  at the front, to the turbine wheel (32) by means of a first welded joint (88) formed between an annular front contact face (90) of the flange portion (86) and a rear weld face (92) in facing relationship with the inner radial periphery of the turbine wheel (32), and
  at the rear, to the turbine hub (40) through a rear second welded joint (96) formed between an annular rear contact face (98) of the flange portion (86) and a front weld face (100) in facing relationship with the outer radial periphery of the turbine hub (40);
  the first welded joint (88) between the annular front transverse contact face (90) of the flange portion (86) and the transverse rear weld face (92) of the turbine wheel (32) comprising an outer front weld band (102) and an inner front weld band (104), the flange portion (86) of the damper plate (74) extending axially over a predetermined length such as to permit access to the outer weld band (102) and inner weld band (104), respectively, of the first welded joint (88) for performing visual control and/or cleaning of the bands (102, 104).

2. The Apparatus according to claim 1, wherein the mean diameters of the annular contact faces, namely the front contact face (90) and rear contact face (98), of the flange portion (86) are substantially equal to each other.

3. The Apparatus according to claim 2, wherein the second welded joint (96), between the annular rear transverse contact face (98) of the flange portion (86) and the front transverse weld face (100) of the turbine hub (40), comprises a rear outer weld band (106) and a rear inner weld band (108).

4. The Apparatus according to claim 1, wherein the mean diameters of the front inner weld band (104) and rear inner weld band (108) of the first and second welded joints (88, 96) are substantially equal to each other.

5. The Apparatus according to claim 4, wherein the mean diameters of the front inner weld band (104) and the rear inner weld band (108) of the first and second welded joints (88, 96) are substantially equal to the internal diameter of the flange portion (86).

6. The Apparatus according to claim 1, wherein the turbine hub (40) includes a radial plate portion (52), the outer radial periphery of which includes an annular boss (110) which extends axially forward and which carries the front weld face (100) of the turbine hub (40).

7. The Apparatus according to claim 1, wherein the flange portion (86) of the damper plate (74) is press-formed.

8. The Apparatus according to claim 1, wherein the second welded joint (96), between the annular rear transverse contact face (98) of the flange portion (86) and the front transverse weld face (100) of the turbine hub (40), comprises a rear outer weld band (106) and a rear inner weld band (108).

9. The Apparatus according to claim 1, wherein the piston (48) is mounted on an annular sliding surface (56) of the turbine hub (40) for axial sliding movement relative thereto.

10. A Hydrokinetic coupling apparatus (10), especially for a motor vehicle, comprising:
- a casing (12) including a rear shell (20) adapted to be coupled in rotation to a driving shaft (B), an impulse wheel (30), and a front shell (18);
- a turbine wheel (32) arranged for rotation with a turbine hub (40) adapted to be coupled in rotation to a driven shaft (A);
- a lock-up clutch (16) for coupling the driving shaft and the driven shaft together, the lock-up clutch (16) being operatively interposed between the turbine wheel (32) and the rear shell (20) and comprising a piston (48) movable axially for releasably coupling together the rear shell (20) and the driven shaft (A), and which includes a damping device (50),
- the damping device (50) comprising at least one guide ring (72) constituting the input element, a damper plate (74) constituting the output element, and circumferentially acting elastic members (76) interposed between the input element (72) and the output element (74) coupled together in rotation but with the ability to perform predetermined circumferential displacement,
- the turbine wheel (32), the turbine hub (40) and the damper plate (74) of the damping device (50) being non-rotatably coupled by means of rigid joints,
- the damper plate (74) comprising at its inner radial end a flange portion (86) axially extending toward the turbine wheel (32) and non-rotatably coupled, by friction welding, respectively:
- at the front, to the turbine wheel (32) by means of a first welded joint (88) formed between an annular front contact face (90) of the flange portion (86) and a rear weld face (92) in facing relationship with the inner radial periphery of the turbine wheel (32), and
- at the rear, to the turbine hub (40) through a rear second welded joint (96) formed between an annular rear contact face (98) of the flange portion (86) and a front weld face (100) in facing relationship with the outer radial periphery of the turbine hub (40);
- the second welded joint (96) between the annular rear transverse contact face (98) of the flange portion (86) and the front transverse weld face (100) of the turbine hub (40) comprising a rear outer weld band (106) and a rear inner weld band (108).

11. The Apparatus according to claim 10, wherein the turbine hub (40) includes a radial plate portion (52), the outer radial periphery of which includes an annular boss (110) which extends axially forward and which carries the front weld face (100) of the turbine hub (40), and wherein the mean diameter of the rear outer weld band (106) is substantially equal to the greatest external diameter of the radial plate portion (52) of the turbine hub (40).

12. The Apparatus according to claim 10, wherein the mean diameters of the front inner weld band (104) and rear inner weld band (108) of the first and second welded joints (88, 96) are substantially equal to each other.

* * * * *